(12) United States Patent
Cardanha et al.

(10) Patent No.: US 11,928,955 B2
(45) Date of Patent: Mar. 12, 2024

(54) SAFETY DISCONNECT MECHANISM WITH INTEGRATED ILLUMINATION FOR ELECTRONIC DEVICES

(71) Applicant: Brilliant Home Technology, Inc., San Mateo, CA (US)

(72) Inventors: Brian Cardanha, San Mateo, CA (US); Iris Yan, San Mateo, CA (US)

(73) Assignee: BRILLIANT HOME TECHNOLOGY, INC., San Mateo, CA (US)

( * ) Notice: Subject to any disclaimer, the term of this patent is extended or adjusted under 35 U.S.C. 154(b) by 109 days.

(21) Appl. No.: 17/142,107

(22) Filed: Jan. 5, 2021

(65) Prior Publication Data

US 2021/0209903 A1  Jul. 8, 2021

Related U.S. Application Data

(60) Provisional application No. 62/957,312, filed on Jan. 6, 2020.

(51) Int. Cl.
*G08B 5/36* (2006.01)
*F21V 8/00* (2006.01)
*G08B 21/02* (2006.01)
*H01H 9/16* (2006.01)
*H05B 45/10* (2020.01)

(52) U.S. Cl.
CPC .............. *G08B 5/36* (2013.01); *G02B 6/0008* (2013.01); *G08B 21/02* (2013.01); *H01H 9/161* (2013.01); *H05B 45/10* (2020.01); *H01H 2225/03* (2013.01)

(58) Field of Classification Search
CPC ........ G08B 5/36; G08B 21/02; G02B 6/0008; H01H 9/161; H01H 2225/03; H01H 23/025; H01H 2219/02; H01H 2300/03; H05B 45/10; H05B 45/20; H05B 47/105; Y02B 90/20; Y04S 20/14
USPC ............................................................ 340/635
See application file for complete search history.

(56) References Cited

U.S. PATENT DOCUMENTS

| 8,624,706 | B2 * | 1/2014 | Xu .......................... | H05B 45/10 |
| | | | | 340/432 |
| 10,403,142 | B1 * | 9/2019 | Shuff ..................... | G08G 1/095 |
| 10,736,190 | B1 * | 8/2020 | Lindsay ................. | H05B 45/10 |

(Continued)

*Primary Examiner* — Omar Casillashernandez
(74) *Attorney, Agent, or Firm* — MAHAMEDI IP LAW LLP

(57) ABSTRACT

A control device includes a controller and a safety disconnect mechanism that is illuminable. The controller couples to a power supply line and a load line. Further, the controller is operable to control a power output on the load line using a power supplied by the power supply line. The safety disconnect mechanism is manipulatable between (i) an engaged state, coinciding with the power supply line being electrically coupled to the load line, and (ii) a disengaged state, coinciding with the power supply line and the load line being electrically decoupled, so that no power output is provided on the load line. A lighting element can be provided with the safety disconnect mechanism, where the lighting element is configured to have at least a first illumination state that is indicative of the safety disconnect mechanism being in the engaged position, and a second illumination state that is indicative of the safety disconnect mechanism being in the disengaged state.

18 Claims, 3 Drawing Sheets

(56) References Cited

U.S. PATENT DOCUMENTS

| | | | | |
|---|---|---|---|---|
| 2007/0253222 A1* | 11/2007 | Driska | .................... | F21S 8/035 |
| | | | | 362/641 |
| 2008/0186126 A1* | 8/2008 | Ying | ................ | H02J 13/00036 |
| | | | | 337/333 |
| 2010/0134314 A1* | 6/2010 | Hsu | ........................ | H01H 9/161 |
| | | | | 340/815.45 |
| 2010/0175973 A1* | 7/2010 | Mathew | ............... | H01H 23/025 |
| | | | | 200/339 |
| 2011/0298392 A1* | 12/2011 | Goyal | ................. | H05B 47/115 |
| | | | | 315/294 |
| 2012/0105228 A1* | 5/2012 | Loveland | ............... | H05B 47/29 |
| | | | | 340/540 |
| 2014/0067143 A1* | 3/2014 | Chen | .................... | G01R 21/133 |
| | | | | 700/291 |
| 2015/0022109 A1* | 1/2015 | Lee | ...................... | H05B 45/395 |
| | | | | 315/200 R |
| 2016/0255702 A1* | 9/2016 | Thompson | ............... | H01H 9/20 |
| | | | | 315/133 |
| 2016/0307715 A1* | 10/2016 | Mittelstadt | ............. | H01H 21/22 |
| 2018/0226793 A1* | 8/2018 | Zhang | .................... | H01H 9/168 |
| 2019/0183696 A1* | 6/2019 | Halanski | ................. | A61F 15/02 |
| 2019/0189147 A1* | 6/2019 | Monteith | ................ | H04R 1/028 |
| 2020/0366079 A1* | 11/2020 | Telefus | ................ | H01H 33/593 |
| 2022/0233735 A1* | 7/2022 | Whittemore | ............. | A61L 2/24 |

* cited by examiner

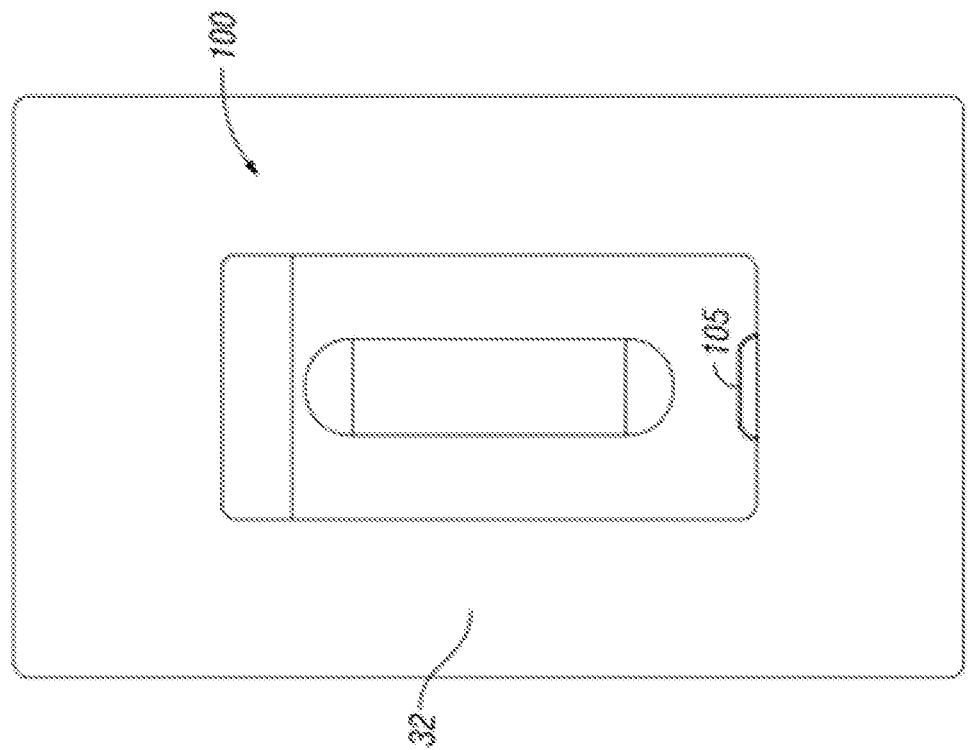
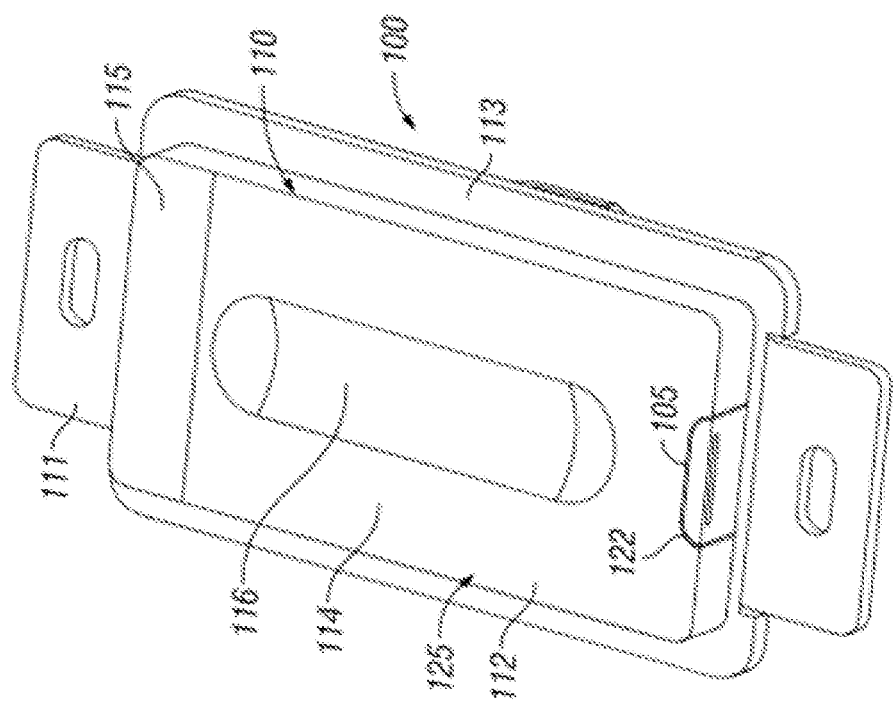

SAFETY DISCONNECT MECHANISM WITH INTEGRATED ILLUMINATION FOR ELECTRONIC DEVICES

RELATED APPLICATION(S)

This application claims benefit of priority to Provisional U.S. Patent Application No. 62/957,312, titled LED INDICATOR FOR SAFETY DISCONNECT, filed Jan. 6, 2020; the aforementioned priority application being hereby incorporated by reference in its entirety.

TECHNOLOGICAL FIELD

Embodiments described herein relate to a safety disconnect mechanism for an electronic device, and more specifically, to a safety disconnect mechanism with integrated illumination for electronic devices.

BACKGROUND

In general, a safety disconnect mechanism disconnects an electrical device from an underlying power supply. In context of wall-mounted electronic, the safety disconnect mechanism removes power from a load line, making manual interaction with load devices (e.g., light fixture) safe and without risk of causing electrical damage or harm.

BRIEF DESCRIPTION OF THE DRAWINGS

FIG. 1A is an isometric view of a control device having an integrated and illuminable safety disconnect mechanism, according to one or more embodiments.

FIG. 1B illustrates a control device with an illuminated safety disconnect mechanism, according to one or more embodiments.

DETAILED DESCRIPTION

Figure 2A:
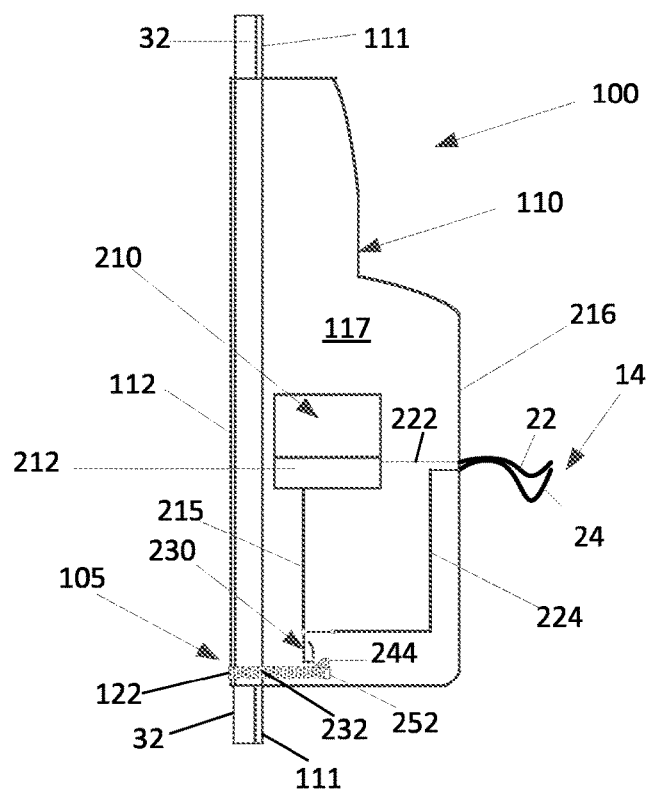
FIG. 2A and FIG. 2B illustrate representative side views of a control device in respective engaged and disengaged states, according to one or more embodiments.

Examples provide for a control device that interfaces with a power supply line of a dwelling to control power output to one or more load devices. The control device includes an illuminable safety disconnect mechanism that is operable to remove power on the power line that supplied the load device. Further, the safety disconnect mechanism can illuminate to indicate when power is being supplied to a connected load line.

In at least some examples, the control device functions as a wall-mounted switch that incorporates an illuminable safety disconnect mechanism. When the control device operates normally, the safety disconnect mechanism illuminates to indicate the load devices are powered, with the illumination appearing as an integral aspect of the control device.

In embodiments, a control device includes a controller and a safety disconnect mechanism that is illuminable. The controller couples to a power supply line and a load line. Further, the controller is operable to control a power output on the load line using a power supplied by the power supply line. The safety disconnect mechanism is manipulatable between (i) an engaged state, coinciding with the power supply line being electrically coupled to the load line, and (ii) a disengaged state, coinciding with the power supply line and the load line being electrically decoupled, so that no power output is provided on the load line. A lighting element can be provided with the safety disconnect mechanism, where the lighting element is configured to have at least a first illumination state that is indicative of the safety disconnect mechanism being in the engaged position, and a second illumination state that is indicative of the safety disconnect mechanism being in the disengaged state.

According to examples, a safety disconnect mechanism includes a structure that is manipulatable to engage and disengage an electrical coupling by which a load line can receive power output.

FIG. 1A is an isometric view of a control device having an integrated and illuminable safety disconnect mechanism, according to one or more embodiments. According to examples, control device 100 is structured to be wall-mountable to an electrical box of a dwelling, to function as a control switch (e.g., such as a light switch) for a load line and/or load devices (e.g., lighting devices, ceiling fan, wall outlets, etc.) connected to the load line. The control device 100 can be installed to control a power level on a connected load line on which one or more devices are electrically connected to receive power. In this way, the control device 100 can interface with a respective power supply and line to control load devices that connect to a connected load line.

In examples, a safety disconnect mechanism 105 provides a manual mechanism by which the power supply to a connected load line is removed. The safety disconnect mechanism 105 is further illuminable to have alternative illumination states, including illumination states that indicate whether or not power is supplied on connected the load line. For example, the safety disconnect mechanism 105 can be provided with at least a first illumination state which indicates that there is power on a connected load line, and a second illumination state which indicates that power has been removed from the connected load line. In this way, the safety disconnect mechanism 105 can be manipulated by a user to remove power from the connected load line, so as to enable the user to safely access and remove devices from the connected load line. Moreover, the illumination state of the safety disconnect mechanism 105 provides a visual indication or feedback to the user as to whether the connected load line is live and with power, or with power removed.

In examples, the control device 100 includes a housing 110 and an exterior surface 112 that is user facing. The housing 110 can include sensors (e.g., touch sensors, proximity sensors, etc.) and control logic or processing resources (e.g., represented by "controller 210" in FIG. 2A and FIG. 2B) to (i) detect and interpret user inputs and sensor events, and (ii) perform control operations to control operational aspects of load device, at least in part by controlling the power output provided on a connected load line. For example, the control device 100 is operable to turn load devices on/off and/or control their power levels (e.g., dimming level for lighting device, rotational speed for ceiling fan, etc.). In examples, the exterior surface 112 can be coupled to a layer of touch sensors to provide a touch-surface region 114 and/or touch input groove 116 where users can provide one or more types of touch input which can be detected and interpreted by the control device 100. As an alternative or variation, the exterior surface 112 can provide buttons or mechanical actuators (not shown) to enable user input for the control device 100. Still further, the exterior surface 112 can include an alternative sensing region 115 where one or more proximity or presence sensors are provided to detect objects within a threshold proximity.

In some examples, the housing 110 includes a protruding segment 125 that provides clearance for the exterior surface to be substantially flush with a faceplate 32 (see FIG. 1B) that can be subsequently mounted when the control device is installed. The housing 110 can further include mounting plates 111 and perimeter flanges 113 which are covered by the faceplate 32 when installation is complete. The mounting plates 111 can be secured to a surrounding wall, and the faceplate 32 is mounted over the protruding segment 115 of housing 110 to cover the mounting plates 111 and flanges 113. During installation, control device 100 can be placed within an electrical box of a dwelling, where respective power supply, load, ground and neutral lines are received and connected.

The housing 110 is structured to retain the safety disconnect mechanism 105 in a manner which makes the exterior surface 122 visible to a user. Further, the safety disconnect mechanism 105 is structurally coupled to a cut-off switching element 230 (see FIG. 2A and FIG. 2B) such that it can be manipulated to force an electric decoupling of a connected load line from a respective connected power supply line. Accordingly, in examples, the safety disconnect mechanism 105 can be manipulated between (i) an engaged position or state, coinciding with the load line being electrically coupled to the power supply line to receive power under control of control device 100, and (ii) a disengaged position or state, coinciding with the load line being decoupled from the power supply line so that no power is carried on the load line (and to the connected devices).

FIG. 1B illustrates the control device 100 installed and operational in a dwelling. In examples, the control device 100 is wall-mounted to control the power supply on a connected load line. In an example show, safety disconnect mechanism 105 is illuminated, representing an illumination state which indicates the connected load line is "live" (or receiving power from the power supply line). As described with various examples, the control device 100 can operate to control different types of devices, including load devices that receive power from the shared load line. The control device 100 can perform switching operations to control a power state, power level or other operational attribute of a load device. Additionally, in some examples, the control device 100 can communicate wirelessly with controlled devices, including, for example, smart-home devices (which can include load devices, such as smart light-devices) which receive wireless commands from the control device 100.

In examples as shown by FIG. 1A-1B and elsewhere in this application, the safety disconnect mechanism 105 is provided on a bottom perimeter edge of exterior facade 112, so as to be readily accessible to a user. In variations, the safety disconnect mechanism 105 is provided on a top or lateral perimeter edge of the external surface 112. As described with examples provided below, the mechanism 105 may be structured as a light pipe which includes an exterior surface 122 that is at least partially translucent. Still further, in other variations, the control device 100 can have other form-factors, functionality, and components.

Figure 2B:
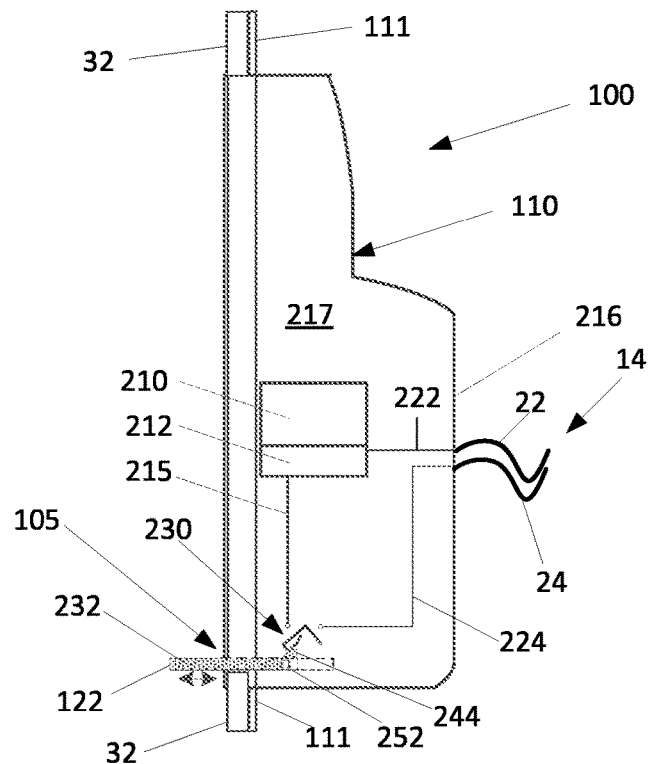

FIG. 2A and FIG. 2B illustrate representative side views of control device 100 in respective engaged and disengaged states. The control device 100 can be mounted within, for example, an electrical box, with a backside 216 of the housing 110 receiving or otherwise interfacing with wirings 14 of the dwelling (e.g., power supply line(s) 22, load line(s) 24, ground and neutral wires, etc.). A portion of the housing 110 can mount within an electrical box inserted in the wall of a dwelling, with mounting flanges 118 extending from a respective top side 111 and bottom side 113 of the housing 110. The mounting flanges 111 can receive mechanical fasteners to securely mount the control device 100 to the wall. The faceplate 32 can be mounted over the control device so as to cover the mounting plates 111 and flanges 113 (see FIG. 1A and FIG. 1B).

In examples, the housing 110 includes an interior 217 where a controller 210 is operatively maintained. The controller 210 can include processing resources that receive inputs from sensors (e.g., capacitive sensors, proximity sensors, etc.) and other input mechanisms of the control device 100. The controller 210 can also include one or more wireless transceivers to exchange data with other devices using, for example, a local area network (e.g., through WiFi, Bluetooth, etc.). The controller 210 can also include a switch interface 212 that electrically couples to a connected power supply line 22 and load line 24, via respective power supply extension lines 222 and load extension lines 224. The switch interface 212 can electrically couple with the power supply line 22 to implement switching operations that result in a desired power output for the load line 24. The switch interface 212 can provide the resulting power output on a power bus lines 215 that connects with the extension line 124 and load line 24. In this way, controller 210 can operate to implement switching operations using the switching interface 212, where switching operations regulate or otherwise control the power supply output on the power bus line 215, so as to, for example, control a power state or power level of a connected load device.

According to some examples, the safety disconnect mechanism 105 is structured to be physically manipulatable longitudinally with respect to an opening of the housing 110. The safety disconnect mechanism 105 can be moved between a seated position that coincides with the engaged position or state, and an unseated position that coincides with the disengaged position or state. In a seated position, an outer surface 122 of safety disconnect mechanism 105 is substantially flush with respect to exterior surface 112 and faceplate 32. In the unseated position, the outer surface 122 of the safety disconnect mechanism 105 protrudes beyond the exterior surface 112.

In embodiments, the safety disconnect mechanism 105 includes a member body 232 that is structured to physically engage and display a switching element 230 of the control device 100 that forms an electrical coupling with a connected load line 24. According to some examples, the switching element 230 bridges power bus line 215 and load line extension 224. By default, the switching element 230 is closed, such that the power bus line 215 can supply power to the load line extension 224, and thus load line 24. The switching element 230 can be physically manipulated by the member body 232 into an open state, such that no power is carried on the load line extension 224 and load line 24.

According to examples, the member body 232 can include one or more structural features which can exert force on switching element 230 in conjunction with the member body 232 being moved from the seated position to the unseated position. In examples, the user can manipulate the safety disconnect mechanism 105 by moving the member body 232 longitudinally outward from the seated position. The member body 232 can include features that facilitate and allow for the user to push/pull or otherwise manipulate the switching element 230 from the closed/default position to an open position. In an example shown by FIG. 2A, the member body 232 includes a wedge 244 or other protruding member that physically contacts and force movement of switching element 230 as the member body 232 is moved from the seated position, so as to form an airgap between the power bus line 215 and the load line extension 224. For example, the movement of the wedge 244 can cause the switching member 230 to pivot or bend, so as to cause the airgap to be formed between the bus line 215 and the load line extension 224.

Accordingly, with respect to an example of FIG. 2A, the safety disconnect mechanism 105 is in a seated position, coinciding with the control device 100 being in an engaged state. In the engaged state, the switch member 230 is closed, and the power bus line 215 and the load extension line 224 are electrically connected. As such, the power line 22 and the load line 24 are electrically coupled through the control device 100, and power is provided on the connected load line 24.

In an example of FIG. 2B, the safety disconnect mechanism 105 is in an unseated position, coinciding with the control device 100 being in a disengaged state. In the disengaged state, the switch member 230 is displaced so as to form an airgap, with the load extension line 224 being disconnected from the power bridge 215. As such, the load line 24 is electrically decoupled from the power supply line 22, and no power is suppled on the connected load line 24.

In some embodiments, the switch member 230 can be implemented as a structural member that is pivotable, bendable or otherwise moveable by physical contact from the member body 232. Still further, the switch member 230 can be structured to bias from a default position. In examples, the default position can correspond to one where the switch member 230 bridges the power bus line 215 and load extension line 224, and a user can pull the safety disconnect mechanism 105 to move the member body 232 out of the seated position, coinciding with wedge 244 moving longitudinally outward to contact and manipulate the switch member 230. In doing so, the switch member 230 can pivot, bend or otherwise move under bias from the default position to an open position, thereby removing power from the load extension line 224. The user can subsequently push the safety disconnect mechanism 105 inward (e.g., such as after the user has removed a load device from the connected load line 24), causing the member body 232 to return to the seated position. In some examples, when the wedge 244 is removed from contacting the switch member 230, the switch member 230 returns to its default position, where the switch member 230 is unbiased and positioned to bridge the gap between the power bus line 215 and the load extension line 224, resulting in the power supply line 22 and load line 24 being electrically recoupled through the control device 100.

As described with examples, the safety disconnect mechanism 105 can be provided with or coupled to lighting elements 252 that illuminate through the exterior surface 122. The lighting elements 252 can be used to exhibit illumination states through the outer surface 122 of the safety disconnect mechanism 105, where the illumination states reflect different connectivity and/or operational states of the control device 100 and/or the connected load line 24.

Accordingly, in examples, the outer surface 122 of member body 232 is at least partially translucent, so that the exterior surface 122 illuminates from light emitted from lighting elements 252. In examples, the illumination states can include a first illumination state which is indicative of the control device 100 being in the engaged state, and a second illumination state which is indicative of the control device 100 being in the disengaged state.

In some examples, safety disconnect mechanism 105 houses a set of lighting elements 252 that are used to implement multiple illumination states. The lighting elements 252 can be seated at a base of the member body 232, and oriented to cast light across a length of the member body 232 to illuminate a particular illumination state through the outer surface 122 of the safety disconnect mechanism 105. Still further, the set of lights 252 can be configured to automatically turn off when, for example, the control device 100 is in the disengaged state (such that no power is supplied on the load line 24). Thus, the illumination state of the lighting elements 252 can include "off".

In some examples, the lighting elements 252 can include Light Emitting Diodes (LEDs). For example, a set of three LEDs can be positioned in a row-wise configuration at the base of the member body 232. Further, in some examples, the lighting elements 252 can be controlled in power level, hue, lighting pattern and selective lighting, to cause different lighting attributes (e.g., color, brightness, blinking/not blinking, etc.) to be exhibited through the outer surface 122 of the safety disconnect mechanism 105. The controller 210 can control the LEDs individually or in group, to reflect an illumination state of the lighting elements 252.

In variations, the safety disconnect mechanism 105 is coupled to interior lighting elements of the control device 100 to receive illumination that reflects one or more illumination states. In such examples, the outer surface 122 is structured to allow for illumination of the safety disconnect mechanism 105.

Further, in examples, the safety disconnect mechanism 105 can be structured, or otherwise equipped to allow desired illumination characteristics from lighting elements. For example, the safety disconnect mechanism 105 can be provided with (or coupled to) lighting elements that can vary in color, brightness, or lighting pattern, to reflect multiple operational states of the control device 100 and/or connected load lines.

In examples, the outer surface 122 can be (i) illuminated when the safety disconnect mechanism 105 is in the engaged state, and not (ii) illuminated when the safety disconnect mechanism 105 is in the disengaged state. Alternatively, multiple illumination states of the outer surface 122 can be distinguished by alternative illumination attributes, such as color, light pattern and or dimming levels. For example, a first illumination state can include a first set of illumination attributes (e.g., white, constant) to represent the engaged state of the safety disconnect mechanism 105, and a second illumination state can include a second illumination attribute (e.g., orange or red, blinking, etc.) to represent the disengaged state of the safety disconnect mechanism 105.

In some examples, the lighting elements 252 can be connected to the load line extension 224, so that lighting elements 252 become non-illuminated automatically when the safety disconnect mechanism 105 is disengaged and power is removed from the connected load line 24. As an addition or variation, the lighting elements 252 can be interconnected to logic that modulates or sets one or more attributes of the lighting elements. The logic can control attributes of one or more of the lighting elements 252 to change, modulate or otherwise vary, for example, a brightness level, hue, and/or lighting pattern (e.g., blinking pattern) of that lighting element. The change in attribute(s) can be made to the lighting elements 252 individually or as a group. In examples, the logic can be implemented to reflect one or more predetermined conditions of the control device 100, such as the occurrence of a malfunction within the control device 100, or a condition affecting, for example, the main or power supply line 22. In some examples, the lighting elements 252 can be connected to a circuit board with integrated logic to control the attributes of the lighting elements 252. The change to lighting elements 252 can result in a separate change to the illumination attribute of the member body 232.

Figure 3A:
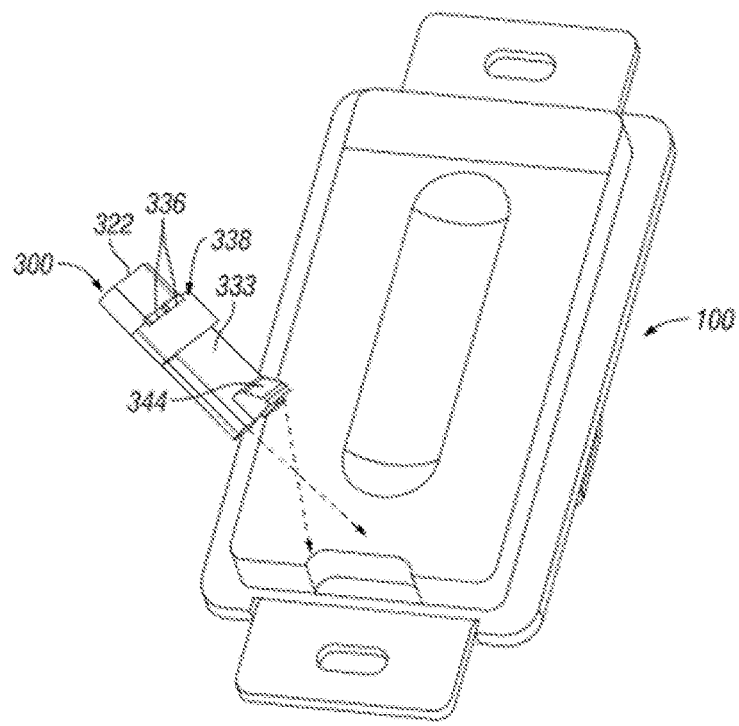
FIG. 3A is an exploded view of a control device, with an example safety disconnect member that is structured in accordance with one or more embodiments.
Figure 3B:
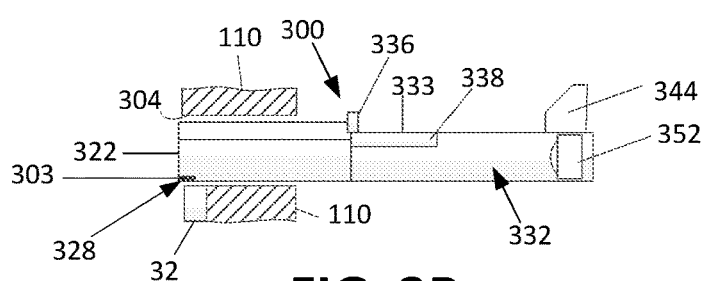
FIG. 3B illustrates a side view of an example safety disconnect member of FIG. 3A, in a seated position, according to one or more embodiments.
Figure 3D:
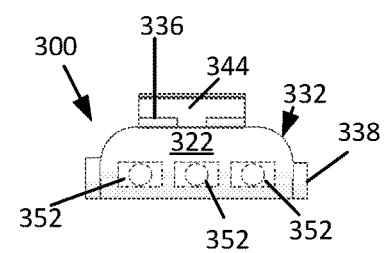
FIG. 3D illustrates a frontal view of an example safety disconnect member of FIG. 3A, according to one or more embodiments.
Figure 3C:
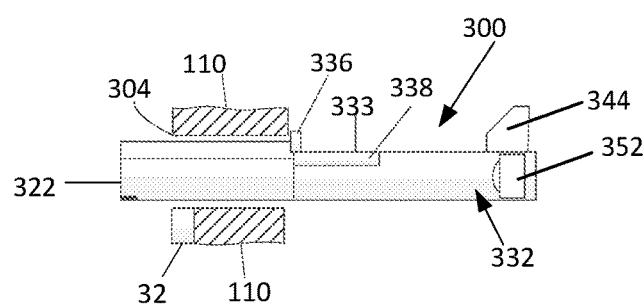
FIG. 3C illustrates a side view of an example safety disconnect member of FIG. 3A, in an unseated position, according to one or more embodiments.

FIG. 3A is an exploded view of a control device, with an example safety disconnect member that is structured in accordance with one or more embodiments. FIG. 3B illustrates a side view of an example safety disconnect member of FIG. 3A in a seated position. FIG. 3C illustrates a side view of an example safety disconnect member of FIG. 3B in an unseated position. FIG. 3D illustrates a frontal view of an example safety disconnect member of FIG. 3A. In examples such as shown with FIG. 3A through FIG. 3D, an example safety disconnect member 300 illustrates an implementation for safety disconnect member 105, as described with examples described with FIGS. 1A, 1B, 2A and 2B.

With reference to FIG. 3A through FIG. 3D, the safety disconnect mechanism 300 includes a member body 332 that extends inward from an outer surface 322. The member body 332 includes a solid, hollow, or partially hollow interior. Further, the member body 332 is also structured to promote illumination, or an aspect of illumination, generated from one or more lighting elements 352 (see FIGS. 3B, 3C and 3D) that are contained within the member body 332, or positioned to direct light through the member body.

In examples, the lighting elements 352 include a set of LEDs which are mounted at a base portion of the member body 332 and oriented to cast light across a length of member body to illuminate outer surface 322. example, a set of three LEDs may be mounted to the base of the member body 332 to cast light onto the outer surface 322 of the member body 332. In variations, the lighting elements 352 can be separately provided on, for example, a circuit board within the housing 110 of control device 100, to illuminate the member body 332 from the inside.

In some examples, the interior of the member body 332 can be structured to diffuse light emitted from the lighting elements 352, or alternatively, to create other effects to enhance a brightness, color or other visual characteristic created through light emission. In some examples, the member body 332 is structured as a unibody component formed from, for example, a polymeric or acrylic material. In variations, the exterior surface 322 of the member body 332 is formed from translucent or partially translucent material, and the member body 332 is formed from alternative material. Still further, in other examples, the member body 332 can be formed from glass or other translucent, or partially translucent materials.

In some examples, the member body 332 includes structural elements 336, 338 that enable limited longitudinal traversal of the safety disconnect mechanism 300 within the control device 100. The structural elements can prevent, for example, overtravel of the member body 332, so that the member body 332 cannot be removed from the control device 100 when in use.

In examples, a top interior surface 333 of the member body 332 can include one or more stops 338, corresponding to structures which prevent the safety disconnect mechanism 300 from being removed from the housing 110 of control device 100. The member body 332 can also include a raised structure, shown as a wedge 344 or other protrusion (e.g., fin) that extends upward. As described with examples of FIG. 2A and FIG. 2B, when the member body 332 is moved from the seated position (coinciding with the safety disconnect mechanism 300 being engaged) into an unseated position (coinciding with the safety disconnect mechanism 300 being disengaged), the wedge 344 forces an airgap or break as between, for example, the power bus line 215 of the control device 100 and the load line extension 224, such that no power is carried on the load line 24 (see FIG. 2A and FIG. 2B). As described in greater detail, when the member body 332 is returned to the seated position, the airgap or break can be removed so that the load line is re-coupled to the control device 100.

With reference to FIG. 3B, the safety disconnect mechanism 300 is shown to be retained within the housing 110 in a seated position. As shown, the safety disconnect mechanism 300 is retained within an opening 304, such that the movement of the member body 332 is limited to the longitudinal direction (along Z-direction). The opening 304 to retain the safety disconnect mechanism 300 can be provided at a bottom perimeter of the perimeter segment 125 of the housing 110, such that a front end 328 of the member body 332 is partially exposed on a bottom side 325. A detente 303 or other surface feature (e.g., lip, tab, recess) can be provided at the bottom side 325 to facilitate a user in pulling the member body 332 outward.

In the seated position, the outer surface 322 is substantially flush with the exterior surface 112 of the control device 100 being provided above the safety disconnect mechanism 300. The safety disconnect mechanism 300 in the seated position can coincide with the control device 100 being in an engaged state. The lighting elements 352 can emit light to provide an illumination state for the member body 332. In examples, the member body 332 forms a light pipe where the structure of the member body 332 can be illuminate from light case by the lighting elements 352. When illuminated, the member body 332 can cast light outward, via the outer surface 322, and downward onto the faceplate 32, via a surface where the detente 303 is provided.

With reference to FIG. 3C, the safety disconnect mechanism 300 is shown to be retained within the housing 110 (shown in phantom) in an unseated position. For example, a user can grasp the detente 303 and pull the member body 332 outward. In the unseated position, the travel of the member body 332 is limited by structural elements 336, 338, which are oversized for the opening 304. In the unseated position, the control device 100 may be switched into a disengaged state. In some examples, the lighting elements 352 are disengaged are otherwise provided without illumination, to reflect that no power is provided on the connected load line.

With reference to FIG. 3D, the illumination surface 322 can be illuminated from lighting elements 352 that cast light from the back (or rear) of the member body 332. The illumination surface 322 can be formed from material that is translucent to emit light from lighting elements 352. Still further, in variations, the illumination surface 322 can diffuse or otherwise transform light case from behind by the lighting elements 352. In this way, the lighting elements 352 can be controlled to emit light with particular characteristics (e.g., hue, brightness, blinking pattern, etc.) that correspond to illumination states, and the illumination surface 322 illuminates from behind in accordance with predetermined illumination states.

Although specific examples have been illustrated and described herein, it will be appreciated by those of ordinary skill in the art that a variety of alternate and/or equivalent implementations may be substituted for the specific examples shown and described without departing from the scope of the disclosure. This application is intended to cover any adaptations or variations of the specific examples discussed herein.

What is claimed is:

1. A control device comprising:
a controller to couple to a power supply line and a load line, the controller being operable to control a power output on the load line using a power supplied by the power supply line;
a safety disconnect mechanism provided with the controller, the safety disconnect mechanism comprising a longitudinal member body being manipulatable by a user to switch the safety disconnect mechanism between (i) an engaged state, in which the user pushes the longitudinal member body into the control device to electrically couple the power supply to the load line, and (ii) a disengaged state, in which the user pulls the longitudinal member body out of the control device to electrically decouple the power supply line from the load line so that no power output is provided on the load line, the safety disconnect mechanism having a member body formed in part of a translucent material; and
wherein the longitudinal member body includes a wedge that physically contacts and manipulates a switch member when the user pulls the longitudinal member body out of the control device to place the safety disconnect mechanism in the disengaged state; and
a lighting element provided with the safety disconnect mechanism and illuminating the translucent material, the lighting element being operable to have at least a first illumination state that is indicative of the safety disconnect mechanism being in the engaged state, a second illumination state that is indicative of the safety disconnect mechanism being in the disengaged state, and a third illumination state in which the lighting element illuminates in accordance with an attribute that reflects a malfunction affecting a power supply mains.

2. The control device of claim 1, wherein the first illumination state is illuminated, and the second illumination state is non-illuminated.

3. The control device of claim 1, wherein the controller includes a switching element that interfaces with the power supply line and the load line, the switching element being operable to control the power output on the load line.

4. The control device of claim 3, wherein the switching element operates separately from the safety disconnect mechanism.

5. The control device of claim 1, wherein the longitudinal member body is moveable longitudinally between a seated position and an unseated position, the longitudinal member body being in the seated position when the safety disconnect mechanism is in the engaged state, and the longitudinal member body being in the unseated position when the safety disconnect mechanism is in the disengaged state.

6. The control device of claim 5, wherein the longitudinal member body is structured to break an electrical coupling between the load line and the power supply line when the member body is moved to the unseated position.

7. The control device of claim 6, wherein the longitudinal member body is structured to form an airgap between the power supply line and the load line when the longitudinal member body is moved into the unseated position.

8. The control device of claim 6, wherein the wedge physically forces the air gap to form when the longitudinal member body is moved into the unseated position.

9. The control device of claim 1, wherein the lighting element is electrically connected to the load line to receive power to illuminate in accordance with the first illumination state when the safety disconnect mechanism is in the engaged state.

10. The control device of claim 1, wherein the lighting element is structured as a light pipe that includes one or more lighting elements at a base, the one or more lighting elements being oriented to direct light over a length of the light pipe to illuminate in accordance with one or more illumination states.

11. The control device of claim 10, wherein each of the one or more lighting elements is a light emitting diode (LED).

12. The control device of claim 10, wherein the light pipe is formed from the translucent material.

13. The control device of claim 10, wherein the light pipe diffuses light emitted from the one or more lighting elements.

14. The control device of claim 10, wherein the one or more lighting elements are controllable to illuminate a lighting attribute that represents a predetermined condition.

15. The control device of claim 14, wherein the lighting attribute includes one or more of a brightness level, a hue, or a blink pattern of the one or more of the lighting elements.

16. The control device of claim 1, wherein the control device is wall-mountable.

17. The control device of claim 16, wherein the control device includes a housing having a protruding segment, the protruding segment including an exterior surface, and wherein the lighting element is positioned to illuminate at or near a bottom perimeter of the protruding segment.

18. The control device of claim 1, wherein the controller operates a switching element to control the power output on the load line.

* * * * *